US009174577B2

(12) United States Patent
Busscher et al.

(10) Patent No.: US 9,174,577 B2
(45) Date of Patent: Nov. 3, 2015

(54) MOUNT INTERFACE TO SLIDE ON WINDSCREEN BUTTON

(75) Inventors: Bradley L. Busscher, Grand Rapids, MI (US); Timothy J. Cercone, Allendale, MI (US); Blake R. Adams, Comstock Park, MI (US)

(73) Assignee: GENTEX CORPORATION, Zeeland, MI (US)

( * ) Notice: Subject to any disclaimer, the term of this patent is extended or adjusted under 35 U.S.C. 154(b) by 495 days.

(21) Appl. No.: 13/600,496

(22) Filed: Aug. 31, 2012

(65) Prior Publication Data
US 2014/0063630 A1    Mar. 6, 2014

(51) Int. Cl.
*B60R 1/04* (2006.01)
*F16F 1/26* (2006.01)

(52) U.S. Cl.
CPC .... *B60R 1/04* (2013.01); *F16F 1/26* (2013.01)

(58) Field of Classification Search
CPC ..................................... B60R 1/04; F16F 1/26
USPC ............... 359/871, 872; 248/549, 475.1, 476; 267/47, 53, 158, 159, 160
See application file for complete search history.

(56) References Cited

U.S. PATENT DOCUMENTS

| 4,254,931 A | * | 3/1981 | Aikens et al. | 248/549 |
|---|---|---|---|---|
| 4,948,085 A | * | 8/1990 | Mittelhauser | 248/549 |
| 5,058,851 A | * | 10/1991 | Lawlor et al. | 248/549 |
| 5,377,948 A | * | 1/1995 | Suman et al. | 248/549 |
| 5,377,949 A | * | 1/1995 | Haan et al. | 248/549 |
| 5,820,097 A | * | 10/1998 | Spooner | 248/549 |
| 5,931,440 A | * | 8/1999 | Miller | 248/549 |
| 6,843,575 B2 | * | 1/2005 | Wachi | 359/876 |

* cited by examiner

*Primary Examiner* — Ricky D Shafer
(74) *Attorney, Agent, or Firm* — Price Heneveld LLP; Scott P. Ryan

(57) ABSTRACT

A rearview device having a rearview display. A rearview device attachment assembly is connected with the rearview display and includes a mount and an attachment clip coupled to the mount. The attachment clip includes a base and first and second opposing flex members extending from the base, each including an arcuate flex portion extending from the base. A connecting portion extends from the arcuate flex portion at an angle toward the base. An engagement portion extends away from the connecting portion at an angle away from the base. First and second protrusions project from the mount, each extending through first and second slots, respectively, in the base. The first and second protrusions are in abutting contact with the engagement portion of the first and second opposing flex members, respectively, thereby forcing the first and second opposing flex members at least partially away from the base.

14 Claims, 5 Drawing Sheets

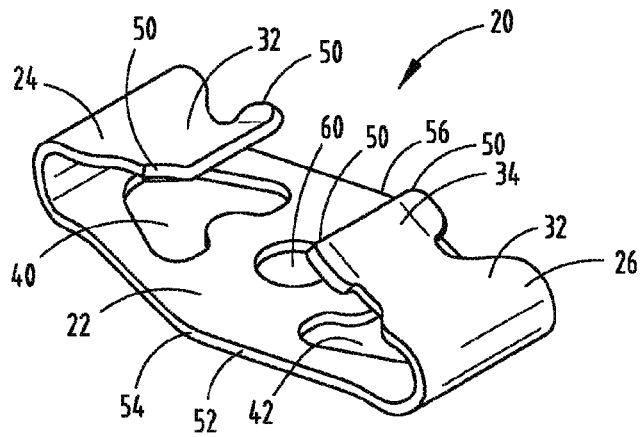
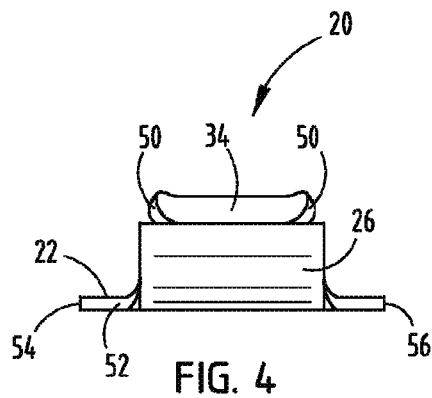
FIG. 3   FIG. 4
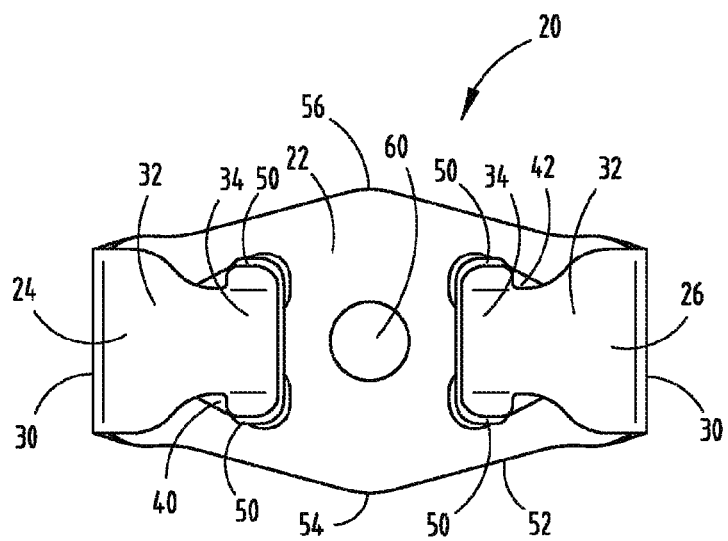
FIG. 5
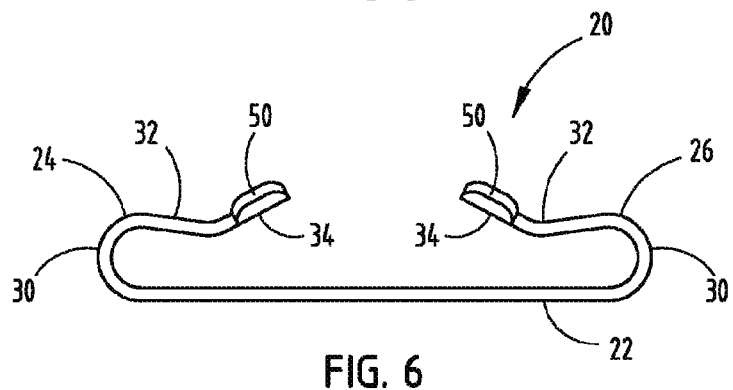
FIG. 6

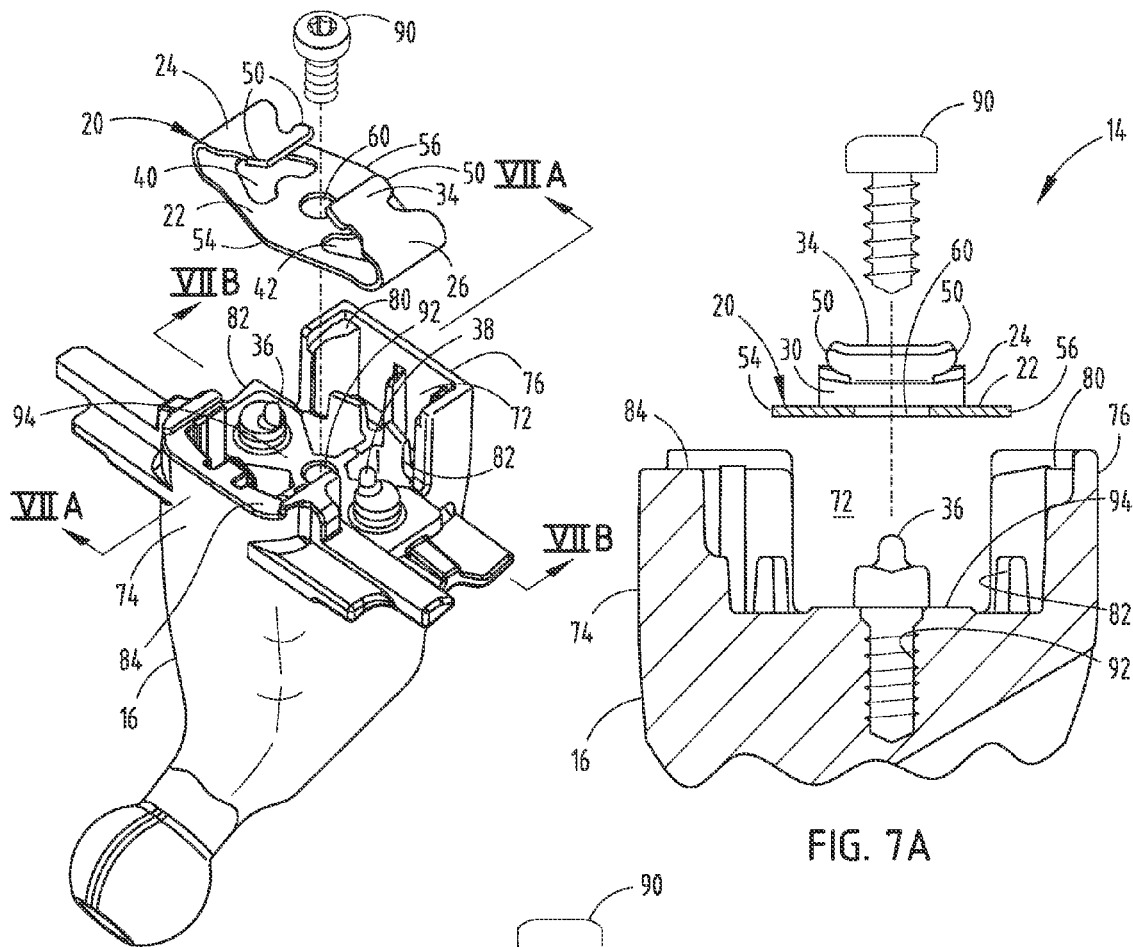
FIG. 7
FIG. 7A
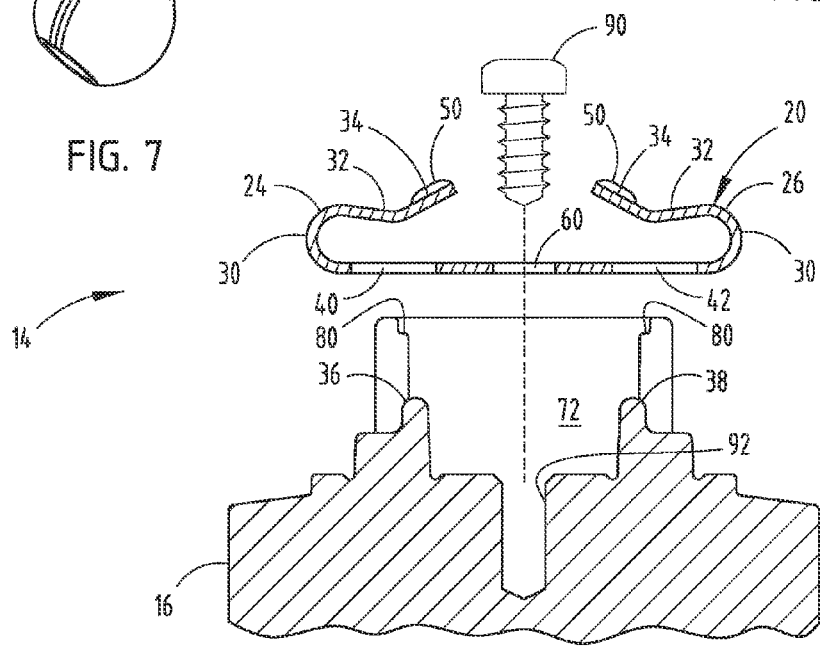
FIG. 7B

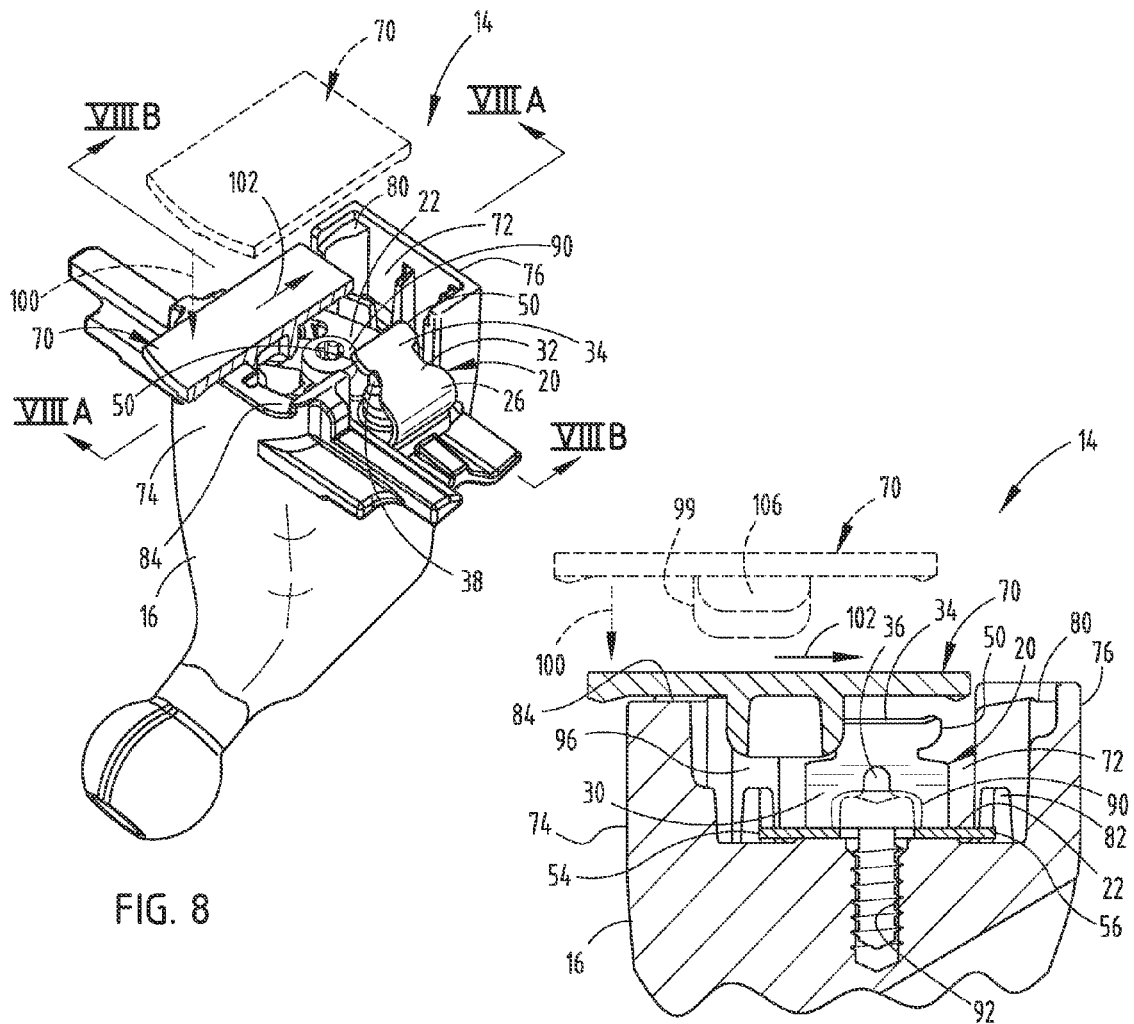
FIG. 8
FIG. 8A
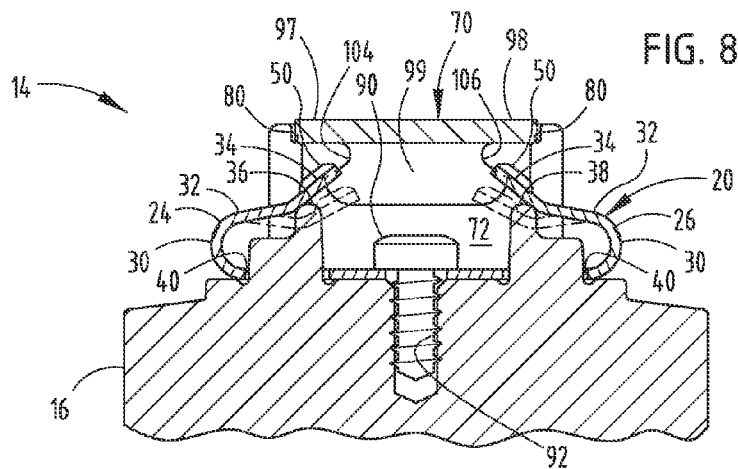
FIG. 8B

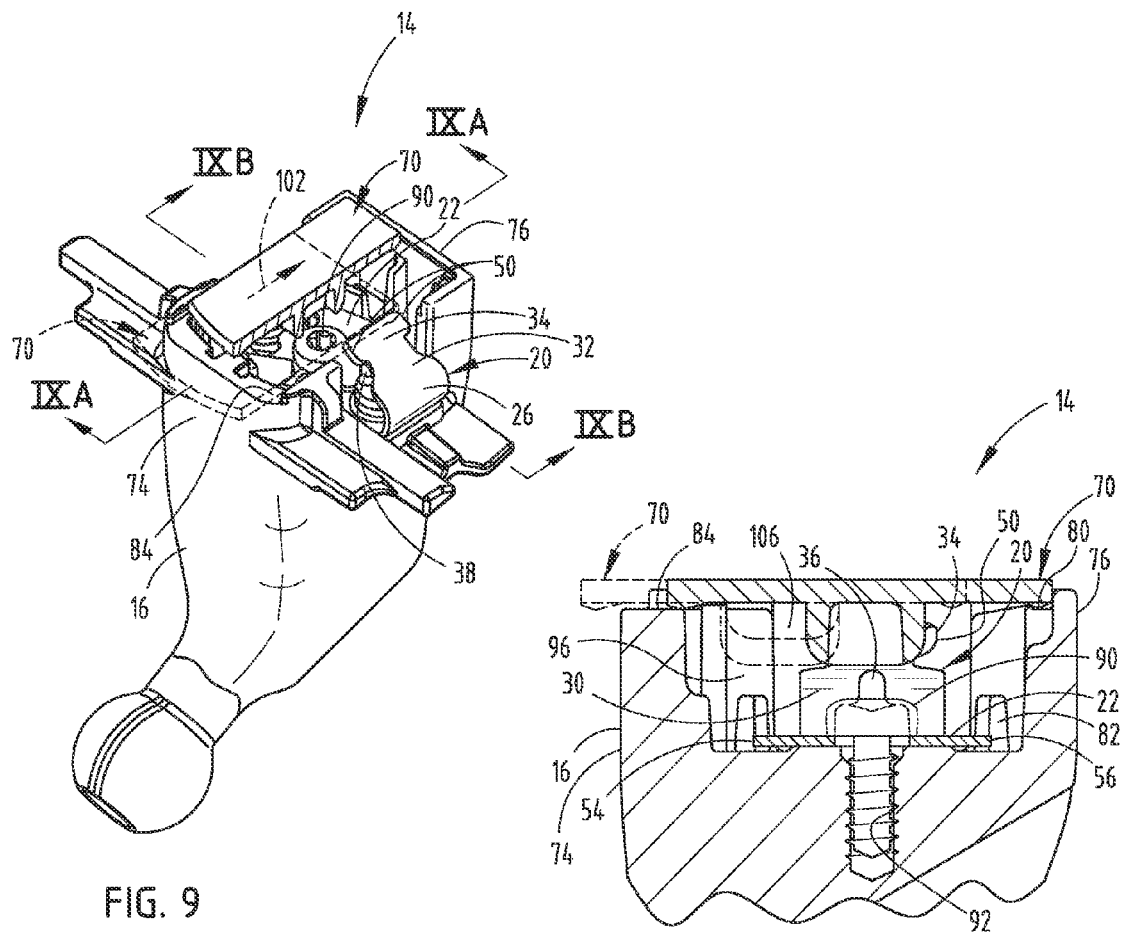
FIG. 9
FIG. 9A
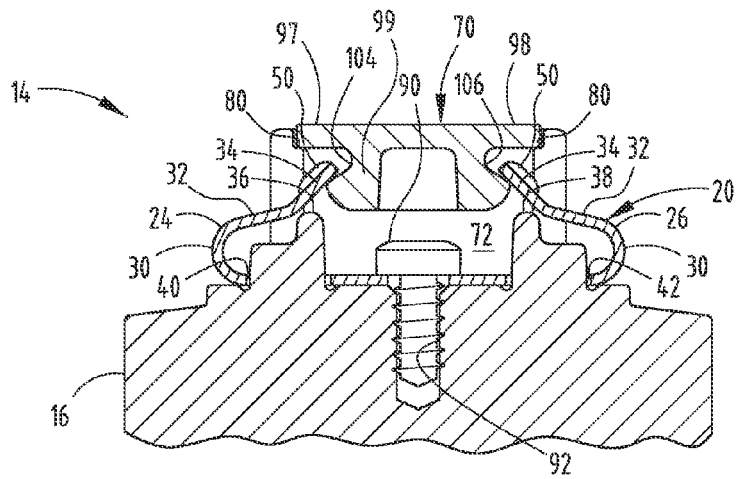
FIG. 9B

US 9,174,577 B2

MOUNT INTERFACE TO SLIDE ON WINDSCREEN BUTTON

BACKGROUND OF THE INVENTION

The present invention generally relates to a mount interface for a rearview device, and more particularly to a mount interface slidably engaged with a mounting button.

SUMMARY OF THE INVENTION

One aspect of the present invention includes a rearview device attachment clip having a base. First and second opposing flex members extend from the base. The first and second opposing flex members include an arcuate flex portion extending from the base. A connecting portion extends from the arcuate flex portion at an angle toward the base. An engagement portion extends away from the connecting portion at an angle away from the base.

Another aspect of the present invention includes a rearview device attachment assembly having a mount. An attachment clip is coupled to the mount and includes a base and first and second opposing flex members extending from the base. The first and second opposing flex members include a flex portion extending from the base. A connecting portion extends from the flex portion at an angle toward the base. An engagement portion extends away from the connecting portion at an angle away from the base. First and second protrusions project from the mount. The first and second protrusions extend through first and second slots, respectively, in the base. The first and second protrusions are in abutting contact with the engagement portion of the first and second opposing flex members, respectively, thereby forcing the first and second opposing flex members at least partially away from the base.

Yet another aspect of the present invention includes a rearview device having a rearview display. A rearview device attachment assembly is connected with the rearview display and includes a mount and an attachment clip coupled to the mount. The attachment clip includes a base and first and second opposing flex members extending from the base. The first and second opposing flex members include an arcuate flex portion extending from the base. A connecting portion extends from the arcuate flex portion at an angle toward the base. An engagement portion extends away from the connecting portion at an angle away from the base. First and second protrusions project from the mount. The first and second protrusions extend through first and second slots, respectively, in the base. The first and second protrusions are in abutting contact with the engagement portion of the first and second opposing flex members, respectively, thereby forcing the first and second opposing flex members at least partially away from the base.

These and other aspects, objects, and features of the present invention will be understood and appreciated by those skilled in the art upon studying the following specification, claims, and appended drawings.

BRIEF DESCRIPTION OF THE DRAWINGS

FIG. 3 is a top perspective view of one embodiment of a rearview device attachment clip of the present invention;

FIG. 4 is a side elevational view of the rearview device attachment clip of FIG. 3;

FIG. 5 is a top plan view of the rearview device attachment clip of FIG. 3;

FIG. 6 is a front elevational view of the rearview device attachment clip of FIG. 3;

FIG. 7 is a top exploded perspective view of one embodiment of a rearview device attachment assembly of the present invention;

FIG. 7A is a side elevational view of the rearview device attachment assembly of FIG. 7 taken at line VIIA-VIIA;

FIG. 7B is a front elevational cross-sectional view of the rearview device attachment assembly of FIG. 7 taken at line VIIB-VIIB;

FIG. 8 is a top perspective view of the rearview device attachment assembly of FIG. 7 prior to engagement with a mounting button;

FIG. 8A is a side elevational cross-sectional view of the rearview device attachment assembly of FIG. 8 taken at line VIIIA-VIIIA;

FIG. 8B is a front elevational cross-sectional view of the rearview device attachment assembly of FIG. 8 taken at line VIIIB-VIIIB;

FIG. 9 is a top perspective view of the rearview device attachment assembly of FIG. 7 after engagement with a mounting button;

FIG. 9A is a side elevational cross-sectional view of the rearview device attachment assembly of FIG. 9 taken at line IXA-IXA; and FIG. 9B is a front elevational cross-sectional view of the rearview device attachment assembly of FIG. 9 taken at line IXB-IXB.

DETAILED DESCRIPTION OF EMBODIMENTS

Figure 1:
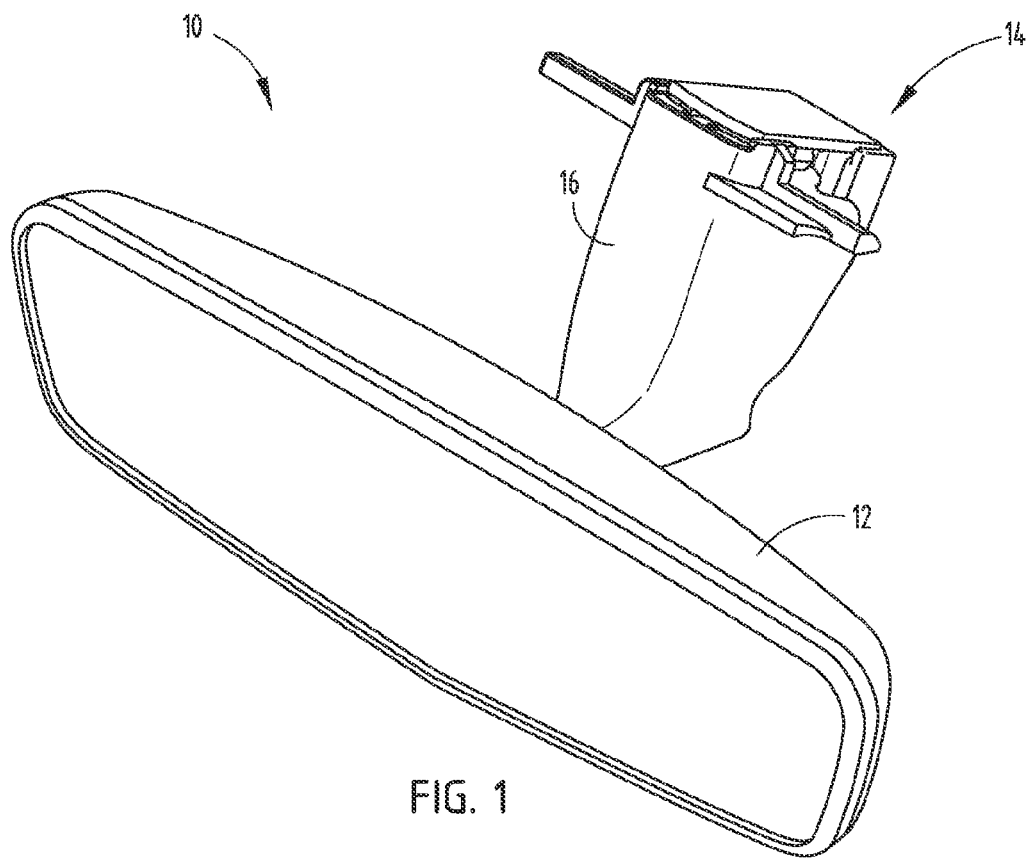
FIG. 1 is a top perspective view of one embodiment of a rearview device of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Further, it will be understood that different embodiments having similar features may include like reference numerals.

Referring to FIGS. 1-6, reference numeral 10 generally designates a rearview device having a rearview display 12. A rearview device attachment assembly 14 is connected with the rearview display 12 and includes a mount 16 and an attachment clip 20 coupled to the mount 16. The attachment clip 20 includes a base 22 and first and second opposing flex members 24, 26 extending from the base 22. The first and second opposing flex members 24, 26 include an arcuate flex portion 30 extending from the base 22. A connecting portion 32 extends from the arcuate flex portion 30 at an angle toward the base 22. An engagement portion 34 extends away from the connecting portion 32 at an angle away from the base 22. First and second protrusions 36, 38 project from the mount 16. The first and second protrusions 36, 38 extend through first and second slots 40, 42, respectively, in the base 22. The first and second protrusions 36, 38 are in abutting contact with the engagement portion 34 of the first and second opposing flex members 24, 26, respectively, thereby forcing the first and second opposing flex members 24, 26 at least partially away from the base 22.

Figure 2:
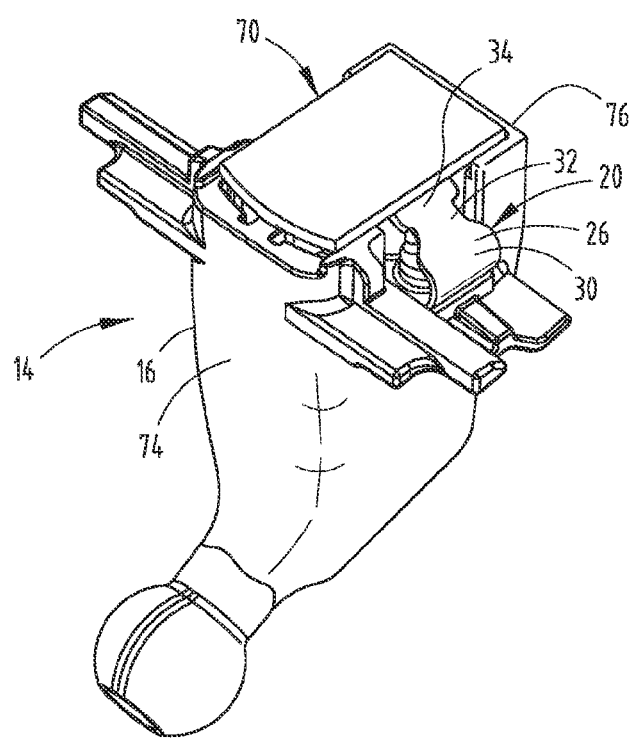
FIG. 2 is a top perspective view of one embodiment of a rearview device attachment assembly of the present invention.

With reference to FIGS. 1 and 2, the rearview device 10 may include a variety of different rearview display constructions, including those with a mirror, a liquid crystal display (LCD) screen, etc. Additionally, the mount 16 could include a variety of electrical systems, as well as a single ball, a multi-ball, or a dual pivot arrangement, as set forth in U.S. patent application Ser. No. 13/405,697, filed on Feb. 27, 2012, entitled "REARVIEW DEVICE SUPPORT ASSEMBLY."

Referring now to FIGS. 3-6, the first and second opposing flex members 24, 26 of the attachment clip 20 generally include an engagement portion 34 with forward and rearward extensions 50 that are angled away from the base 22 of the attachment clip 20. The forward and rearward extensions 50 assure easy installation of the mount 16 and the attachment clip 20 onto a mounting button 70. The arcuate flex portion 30 of the attachment clip 20 is designed to flex such that the connecting portion 32 and the engagement portion 34 are pushed away from the base 22 during installation of the attachment clip 20 onto the mount 16. The first and second protrusions 36, 38 that project upwardly from the mount 16 drive the first and second opposing flex members 24, 26 away from the base 22, as discussed herein. The base 22 of the attachment clip 20 includes a widened central section 52 generally defining first and second apexes 54, 56 that extend away from a mechanical fastener aperture 60 that extends through the base 22 at a central portion thereof. It is also contemplated that multiple fastener apertures may be arranged in various locations through the base 22. The base 22 also includes the first and second slots 40, 42 configured to receive the first and second protrusions 36, 38. In another alternative embodiment, it is contemplated that the first and second protrusions 36, 38 could project downward from the first and second opposing flex members 24, 26. In yet another alternative embodiment, the first and second protrusions 36, 38 partially extend downward from the first and second opposing flex members 24, 26 and also partially extend upward from the mount 16. The first and second slots 40, 42 generally define a V-shaped aperture. The V-shaped aperture allows the first and second protrusions 36, 38 to extend through the base 22, while not substantially limiting the overall strength and rigidity of the attachment clip 20. It is also contemplated that the first and second slots 40, 42 could be square, round, oval, triangular, etc.

As shown in FIGS. 7-7B, the attachment clip 20 serves as a rearview device attachment clip configured to secure the mount 16, and accordingly, the rearview device 10 to the mounting button 70. The mount 16 includes a receiving cavity 72 configured to receive the attachment clip 20 therein. The receiving cavity 72 is generally defined by forward and rearward support walls 74, 76. Each of the forward and rearward support walls 74, 76 include multiple notches 80 configured to abut and support the mounting button 70. A gap 82 is provided between the forward support wall 74 and the rearward support wall 76, which is generally configured to receive the attachment clip 20. Additionally, the forward support wall 74 includes a small space 84 designed to receive the mounting button 70 during installation.

Referring again to FIGS. 7-7B, the attachment clip 20 is generally secured to the mount 16 by way of a mechanical fastener 90. The mechanical fastener 90 is received through the mechanical fastener aperture 60 disposed in the base 22 of the attachment clip 20. The mechanical fastener 90 is drawn into a receiving aperture 92 in the mount 16. As the mechanical fastener 90 is secured with the mount 16, the first and second protrusions 36, 38 extend through the first and second slots 40, 42 and into contact with the first and second opposing flex members 24, 26, respectively. As the mechanical fastener 90 is drawn into secure engagement with the base 22 of the attachment clip 20 and the base 22 is drawn into secure engagement with an engagement surface 94 of the mount 16, the first and second opposing flex members 24, 26 are forced upward away from the mount 16. In one embodiment, the first and second opposing flex members 24, 26 are pushed away from the mount 16 approximately 1.2 millimeters. However, it is contemplated that the first and second opposing flex members 24, 26 may be forced away from the mount 16 between 1 and 1.4 millimeters. Once the first and second opposing flex members 24, 26 are pushed away from the mount 16, the first and second opposing flex members 24, 26 are, in effect, pre-loaded such that the ease of installation of the mount 16 onto the mounting button 70 is increased. Stated differently, by pre-loading the attachment clip 20, the effort required by an installer to force the attachment clip 20 and the mount 16 into secure engagement with the mounting button 70 is lessened.

Referring now to FIGS. 8-8B, the mount 16 is configured to slidably engage the mounting button 70. The mounting button 70 includes a body portion 99 and first and second side flanges 97, 98 that define first and second channels 104, 106, respectively. During installation of the mount 16 to the mounting button 70, the mounting button 70 is forced in the direction of arrow 100 into a forward portion 96 of the receiving cavity 72 in the mount 16. The mounting button 70 is then slid in the direction of arrow 102, such that the first and second channels 104, 106 formed in the mounting button 70 receive the forward extensions 50 on the engagement portion 34 of the first and second opposing flex members 24, 26. As the first and second channels 104, 106 engage the engagement portion 34 of the first and second opposing flex members 24, 26, the first and second opposing flex members 24, 26 are drawn away from the mount 16. In one embodiment, the first and second opposing flex members 24, 26 are moved approximately 0.5 millimeters. The first and second side flanges 97, 98 that engage the notches 80 in the forward support wall 74 and the rearward support wall 76 of the mount 16. Because the forward and rearward support walls 74, 76 and the first and second side flanges 97, 98 are generally rigid, and because the attachment clip 20 is generally flexible, the first and second opposing flex members 24, 26 are drawn away from the base 22 of the attachment clip 20, and consequently away from the mount 16.

After engagement of the mount 16 with the mounting button 70, the first and second opposing flex members 24, 26 are deflected away from the base 22 between 1.2 and 1.8 millimeters—generally 1.6 millimeters. However, it is contemplated that the first and second opposing flex members 24, 26 could be deflected away from the base 22 greater than 1.8 millimeters or less than 1.2 millimeters. In the illustrated embodiment, the installation force required to install the mount 16 onto the mounting button 70 is approximately 300 Newtons, but could be as low as 270 Newtons, or even lower. In addition, the detach force, or retention force, is approximately 300 Newtons, but could be as low as 265 Newtons, or lower. It should be noted that the deflection that occurs in the attachment clip 20 is generally insufficient to permanently deflect or bend the first and second opposing flex members 24, 26. Consequently, if the mount 16 is uninstalled from the mounting button 70, the general shape of the attachment clip 20 is maintained and is not otherwise deformed such that it may be reused again when the mount 16 is reinstalled onto the mounting button 70.

The rearview device attachment assembly 14, as disclosed herein, provides an ideal design that minimizes the effort required for installation and detachment of the mounting button 70, while maintaining exceptional retention force. Moreover, several installation and uninstallation cycles may be repeated without a spring clip or the entire rearview device attachment assembly 14 losing the desired retention force. Previous assemblies typically lost retention force after initial installation. The initial installation effort or load force in prior art products includes approximately 450 Newtons. However, this load force changes after the initial installation as the prior art clip becomes deformed. In one embodiment of the current concept, the initial installation force is approximately 270 Newtons. The load force does not substantially change after the initial installation because the attachment clip 20 does not deform. In one embodiment of this concept, the clamp load, which measures the force exerted by the mounting button 70 on the attachment clip 20 is about 300 to 400 Newtons. However, the clamp load could extend below or above this range. The configuration of the attachment clip 20 and the mount 16 results in a minimized install/clamp load ratio. Additionally, many current products include a 375 Newton detachment force, which results in spring clips of past products to yield, losing their ability to be used again. In one embodiment of the present invention, an assembly having a detachment force of approximately 265 Newtons is provided. Further, various coatings may be applied to the attachment clip 20, the mount 16, or both to reduce the installation and detachment forces.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Examples of electrochromic elements are described in U.S. Pat. No. 7,427,150, entitled "Rearview Mirror Assembly Including A Multi-Functional Light Module," U.S. Pat. No. 7,372,611 entitled "Vehicular Rearview Mirror Element And Assemblies Incorporating These Elements," U.S. patent application Ser. No. 13/470,147, entitled "Rearview Assembly For A Vehicle," U.S. patent application Ser. No. 12/774,721, entitled "Rearview Mirror Assemblies With Anisotropic Polymer Laminates," U.S. Pat. No. 8,228,590, entitled "Electro-Optic System Configured To Reduce A Perceived Color Change," and U.S. Provisional Application Ser. No. 61/637,527, entitled "Display Mirror System," all of which are hereby incorporated by reference in their entirety.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A rearview device attachment assembly comprising:
   a mount;
   an attachment clip coupled to the mount and having a base and first and second opposing flex members extending from the base, the first and second opposing flex members including:
      a flex portion extending from the base;
      a connecting portion extending from the flex portion at an angle toward the base; and
      an engagement portion extending away from the connecting portion at an angle away from the base; and
      first and second protrusions projecting from the mount, the first and second protrusions extending through first and second slots, respectively, in the base, wherein the first and second protrusions are in abutting contact with the engagement portion of the first and second opposing flex members, respectively, thereby forcing the first and second opposing flex members at least partially away from the base.

2. The rearview device attachment assembly of claim 1, further comprising:
   a mounting button adapted to slidably engage the first and second opposing flex members of the attachment clip.

3. The rearview device attachment assembly of claim 2, wherein the attachment clip applies a force of less than 300 Newtons on the mounting button during installation.

4. The rearview device attachment assembly of claim 2, wherein the attachment clip applies a retention force of less than 300 Newtons on the mounting button.

5. The rearview device attachment assembly of claim 1, wherein the first and second protrusions deflect the first and second opposing flex members, respectively, approximately 1 to 1.4 millimeters.

6. The rearview device attachment assembly of claim 2, wherein the mounting button deflects the first and second opposing flex members, respectively, approximately 1.2 to 1.8 millimeters.

7. The rearview device attachment assembly of claim 1, further comprising:
forward and rearward extensions angled away from the base.

8. The rearview device attachment assembly of claim 1, wherein the base has a widened central section with a central fastener receiving aperture.

9. A rearview device comprising:
a rearview display;
a rearview device attachment assembly connected with the rearview display and comprising:
a mount and an attachment clip coupled to the mount, the attachment clip having a base and first and second opposing flex members extending from the base, the first and second opposing flex members including:
an arcuate flex portion extending from the base;
a connecting portion extending from the arcuate flex portion at an angle toward the base; and
an engagement portion extending away from the connecting portion at an angle away from the base; and
first and second protrusions projecting from the mount, the first and second protrusions extending through first and second slots, respectively, in the base, wherein the first and second protrusions are in abutting contact with the engagement portion of the first and second opposing flex members, respectively, thereby forcing the first and second opposing flex members at least partially away from the base.

10. The rearview device of claim 9, further comprising:
a mounting button adapted to slidably engage the first and second opposing flex members of the attachment clip.

11. The rearview device of claim 10, wherein the attachment clip applies a force of less than 300 Newtons on the mounting button during installation.

12. The rearview device of claim 10, wherein the attachment clip applies a retention force of less than 300 Newtons on the mounting button.

13. The rearview device of claim 9, wherein the first and second protrusions deflect the first and second opposing flex members, respectively, approximately 1 to 1.4 millimeters.

14. The rearview device of claim 10, wherein the mounting button deflects the first and second opposing flex members, respectively, approximately 1.2 to 1.8 millimeters.

* * * * *